June 2, 1959 L. L. ANDERSON ET AL 2,888,724
SAFETY BELT BUCKLE
Filed Jan. 23, 1957 3 Sheets-Sheet 1
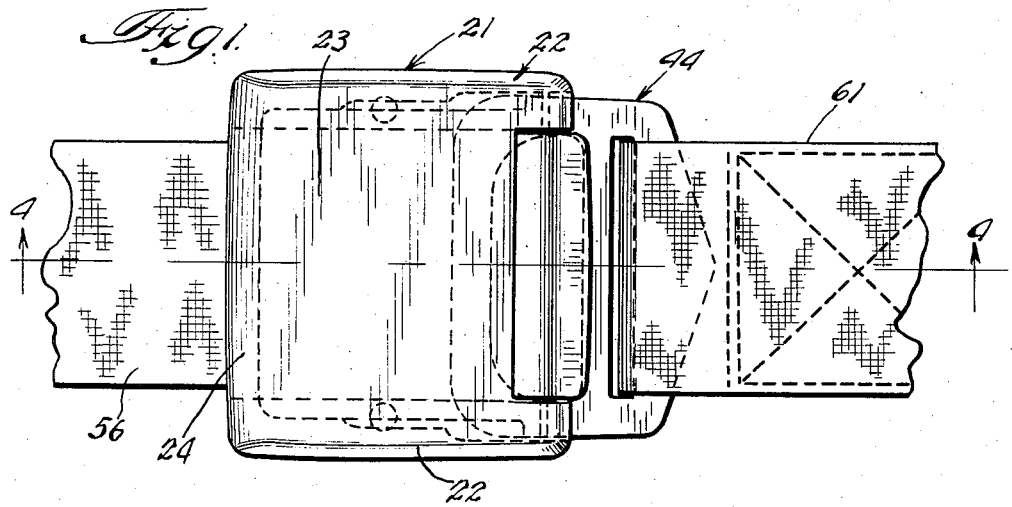
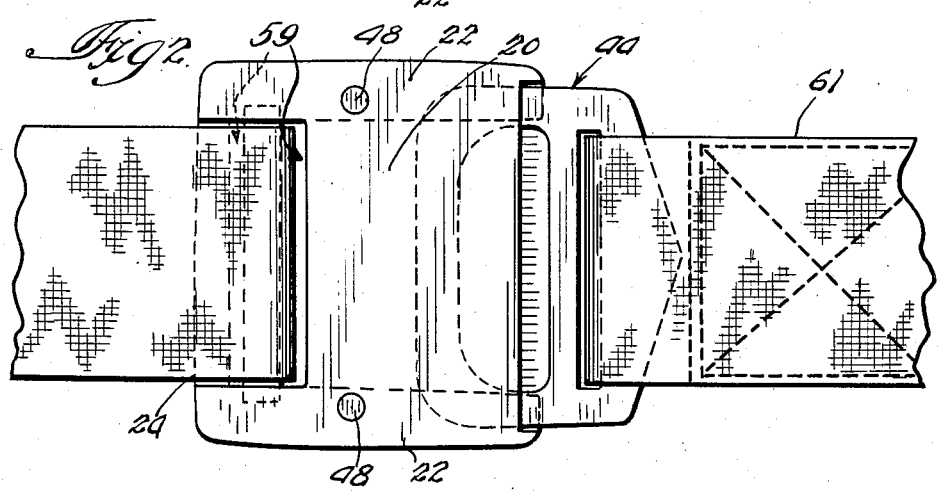
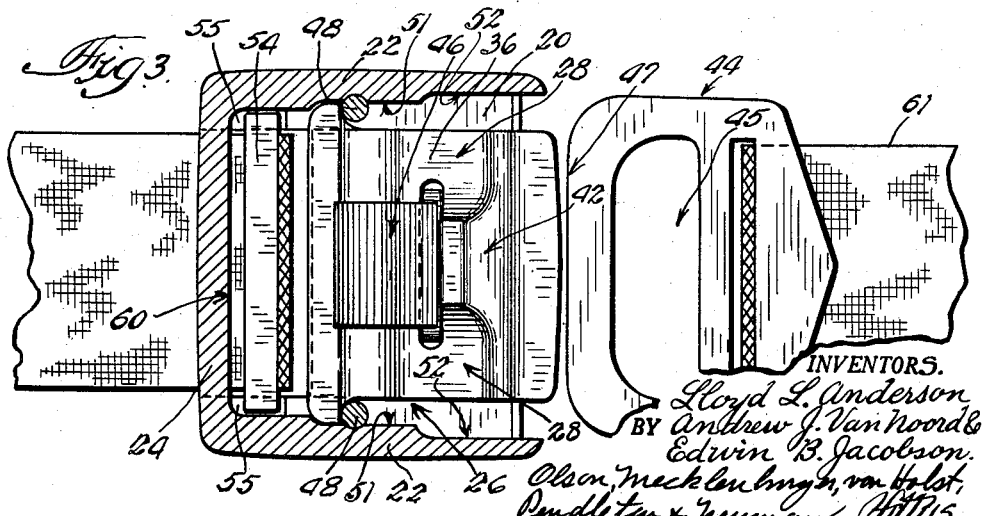

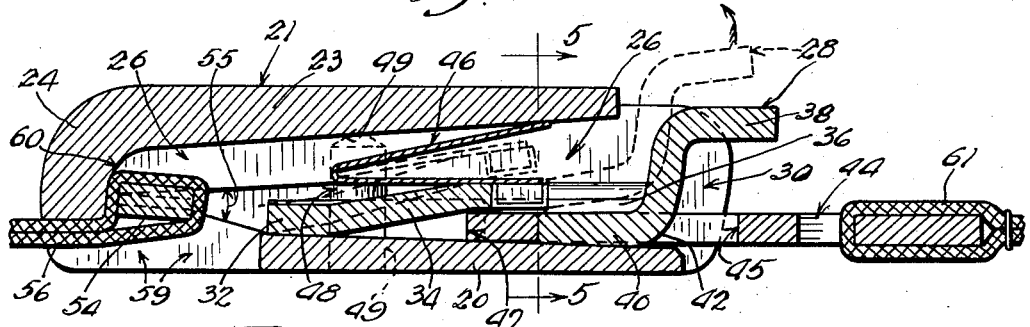
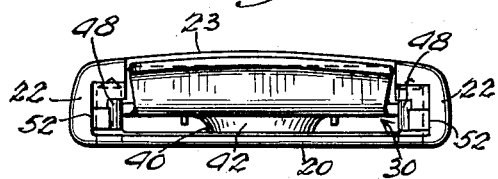
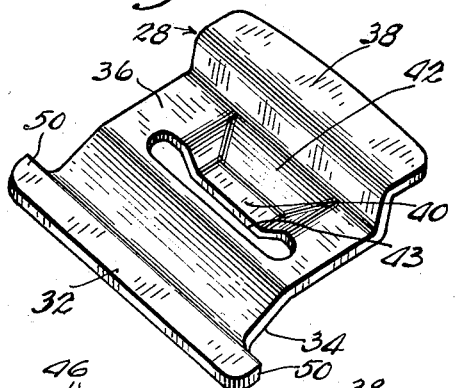
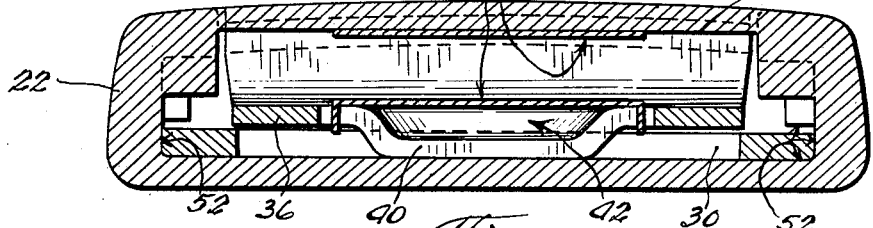
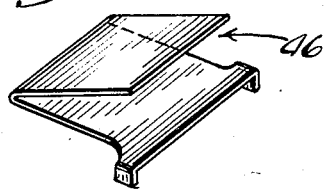

June 2, 1959 L. L. ANDERSON ET AL 2,888,724
SAFETY BELT BUCKLE
Filed Jan. 23, 1957 3 Sheets-Sheet 3
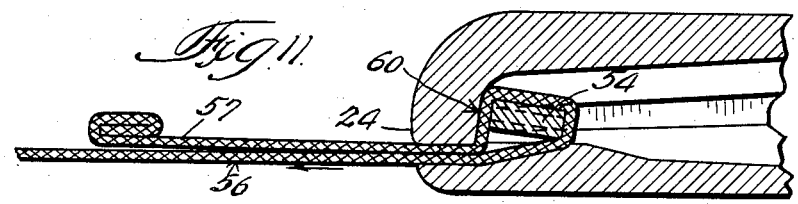
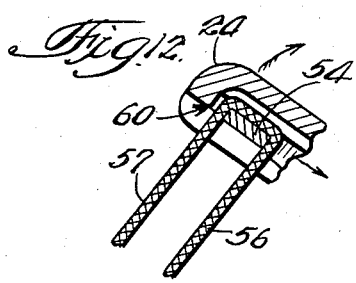
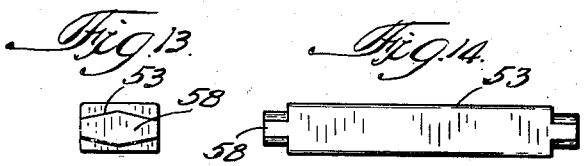
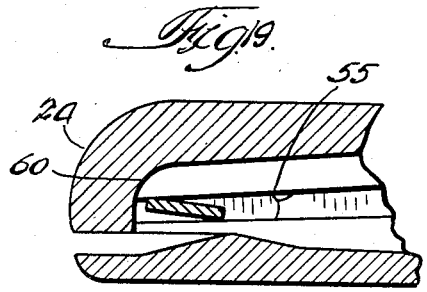
INVENTORS.
Lloyd L. Anderson
Andrew J. Van Noord &
Edwin B. Jacobson.
BY United States Patent Office 2,888,724
Patented June 2, 1959

2,888,724

SAFETY BELT BUCKLE

Lloyd L. Anderson, Andrew J. Van Noord, and Edwin B. Jacobson, Grand Rapids, Mich., assignors to Jervis Corporation, Grandville, Mich., a corporation of Michigan Application January 23, 1957, Serial No. 635,764

7 Claims. (Cl. 24—77)

This invention relates to a new article of manufacture and more specifically to new safety belt buckles.

The safety belt buckles described in the prior art have drawbacks limiting their utility in many respects. For example, in some buckles the fastening and adjusting is provided by drawing a free end of the belt through a buckle provided with a spring-tensioned cam securing means. In this buckle a cylinder with gripping surface is mounted to pivot off-center of its principal axis. The belt is passed through the buckle and under the off-center cylinder. A spring device rotatably urges the cylinder against the housing to provide gripping means securing the belt. In such a buckle, the frictional securing means is somewhat subject to slippage. Further, such continued gripping of the belt produces constant friction which rapidly abrades and weakens the belt fabric.

In the above described and many other prior art buckles the belt releasing means so protrudes that it may be accidentally released by catching on portions of a wearer's clothing. Again, many prior art buckles require adjustment to the body of the wearer with each fastening as contrasted to a device whereby a single adjustment is made to each individual with subsequent locking accomplished by one positive action without further adjustment.

Accordingly, one object of the present safety belt buckle invention is the provision of separate adjustment and locking means in a single combination.

Another object is to provide a safety belt buckle which contains a positive but preferably self-actuated locking device.

A further object is the provision of a safety belt buckle which is readily releasable with a minimum of pressure.

A further object is the provision of a safety belt buckle in which the hazard of accidental release is minimized.

A further object is the provision of a safety belt buckle in which abrasion of the belt is held to a minimum.

A further object is the provision of a safety belt buckle which is particularly adapted for use in automobiles.

A further object is the provision of a safety belt buckle which has a smooth over-all appearance and utilizes a unitary housing.

A further object is the provision of a safety belt buckle which is readily fastened.

A still further object is the provision of a safety belt buckle having a one-hand adjustment feature.

Further and additional objects will appear from the description, accompanying drawings, and appended claims.

In one form the present invention comprises a buckle for use with a safety belt comprising a box-like housing of unitary construction having a longitudinal cavity extending from one end thereof substantially the length of the buckle housing and having a transverse aperture in one face of the housing communicating with said cavity. There is also provided a stepped latch member secured in the cavity, pivotal between an open and a locking or latching position. A spring is disposed within the cavity urging the latch to the latching position against the apertured face of said housing. There is further provided an apertured tongue adapted for insertion in the cavity between the latch and the apertured face, the latch being adapted to ride over and engage the apertured tongue. An adjustment bar is disposed across the other end of the cavity and slidably and rockably reciprocable therein, the bar being adapted to receive the safety belt passing thereover and through the transverse aperture securing the belt between the adjustment bar and the closed end of the cavity. The described housing is unique in that it is cast in one piece in the form of a shell having an internal cavity shaped and adapted to receive and maintain the working elements of the latching and adjustment mechanism in operating position and has a smooth external contour to minimize accidental catching and tearing of clothing of the wearer.

For a more complete understanding of this invention reference should now be had to the drawings, wherein:

Figure 1 is a top plan view of a safety belt buckle illustrating one embodiment of the invention;

Fig. 2 is a bottom plan view of the safety belt buckle of Fig. 1;

Fig. 3 is a sectional plan view of the safety belt buckle of Fig. 1, showing the tongue removed and spaced from the housing;

Fig. 4 is a longitudinal sectional view taken on line 4—4 of Fig. 1, showing the latch mechanism in locked position, the open position being illustrated in broken lines;

Fig. 5 is a transverse sectional view taken along the line 5—5 of Fig. 4;

Fig. 6 is an end view of the buckle of Figs. 1 and 2;

Fig. 7 is a side view of the embodiment of Fig. 1;

Fig. 8 is an end view of the embodiment of Fig. 1 showing the tongue aperture and latching member;

Fig. 9 is a perspective view of the latching member;

Fig. 10 is a perspective view of the spring means shown in Figs. 3 and 4;

Fig. 11 is a fragmentary longitudinal sectional view of the buckle of Fig. 1 showing the belt adjustment means in belt holding position;

Fig. 12 is a fragmentary sectional view similar to Fig. 11, showing the belt and adjustment means in released position;

Fig. 13 is an end view of another embodiment of adjustment bar;

Fig. 14 is a side view of the bar in Fig. 13;

Fig. 15 is an end view of another embodiment of an adjustment bar;

Fig. 16 is a side view of the bar in Fig. 15;

Fig. 17 is an end view of still another embodiment of an adjustment bar;

Fig. 18 is a side view of Fig. 17; and

Fig. 19 is an enlarged fragmentary sectional view of the safety belt buckle as shown in Figs. 2 and 3, showing the closed end of the housing and one end of the adjustment bar in a rocked position.

Referring now to the drawings and more particularly to Figs. 1, 2 and 3, there is shown a box-like housing 21 of unitary construction having opposed faces 23 and 20, sides 22 and end member 24. Referring particularly to Figs. 3 and 4 there is shown in cross-section a blind cavity 26 extending substantially the entire length of said housing 21. There is a latch member 28 disposed and secured within the cavity 26 extending to a point within the aperture at the cavity opening 30. The latch member 28 (referring also to Fig. 9) is provided with a base or pivot step 32, an angularly extending portion 34, an intermediate latching step 36, and an angularly extended portion to provide a protruding lip 38 which extends outside the cavity 26. The face is preferably recessed at the cavity opening to permit the lip 38 to extend outside the cavity. The step 36 is provided with an extending catch 40 having a forwardly inclined surface 42 and a holding surface 43, said surface 42 being adapted to ride over an apertured tongue member 44 shown in Fig. 3. A spring 46 (shown alone in Fig. 10) is disposed between the other face of the housing 23 and the latch member 28 urging said latch member toward the one face 20 of said housing.

The latch member 28 is secured in cavity 26 by means of a pair of pins 48. Pins 48 are secured in apertures 49 permitting the latch member limited rotation about a fulcrum at the lower step 32, nibs 50 protruding transversely from the latch member prevent withdrawal from the cavity 26 by abutting against the pins 48. In Fig. 3 is shown a pair of slots 51 in which the nibs 50 slide and which prevent displacement of the pivoting step 32 from face 20. There is also shown a pair of lateral opposed grooves 52 in sides 22 adjacent the opening 30. In operation, the apertured tongue 44 (see also Fig. 4) is inserted in the cavity 26 below the latch member 28. The tongue 44 is constructed to slidably engage the grooves 52 which prevent displacement of tongue 44 in the direction of the latch. The forward portion 47 of said tongue abuts against the inclined surface 42 of the catch 40 on latch member 28, urging the latch 28 upward against spring resistance provided by the spring 46. When the forward portion 47 of the tongue 44 passes the catch 40, said catch is urged by spring 46 into the tongue aperture 45 securing the tongue 44 within the cavity 26. To release the tongue 44 the latch 28 is lifted by means of the lip 38, against the pressure of spring 46 to the position shown in broken lines in Fig. 4, permitting withdrawal of the tongue 44.

There is also provided in this buckle housing (referring to Figs. 3 and 4) an adjustment bar 54 slidably and rockably disposed in lateral channels 55 within cavity 26, the sliding motion of said bar 54 being between an arcuate gripping surface 60 of end 24 and the latch 28. A belt 56 passes through the transverse aperture 59 (see Fig. 4) in the housing 21, over the adjustment bar 54, and out of the aperture adjacent said end 24.

In Fig. 3 it may be seen that internal lateral configuration of the cavity as enclosed by sides 22 describes a successive narrowing from grooves 52 to channels 55 with the slots 51 intermediate. This successive stepping permits ready assembly of the buckle and ease of operation in that the adjustment bar, latch and tongue are maintained in their respective positions by such stepped construction.

Referring to Figs. 11 and 12 it may be seen that in operation the belt 56 passes over said bar 54 and through transverse aperture 59, whereby tension in the direction of the arrow in Fig. 11 draws the bar and free end of belt 57 against the gripping face 60 of the housing end 24. It is preferred that the gripping face 60 be of an arcuate form to permit the rocking of the adjustment bar 54 in channels 55 (shown in Figs. 3 and 4) while still maintaining maximum contact between the bar, belt, and gripping face for more secure holding of the belt. Thus the belt is normally maintained in the housing by the pressure of bar 54 against face 60, and any increased thrust applied to belt 56 substantially increases the locking force on the belt. Release and adjustment of the belt 56 is accomplished by tilting the buckle 21 at its end 24 to an angle away from the plane of the belt in the direction of the arrow, whereby the belt assumes the position shown in Fig. 12. The adjustment bar 54 normally held by the belt 56 is thus drawn away from end 24 and frees the belt to permit release and sliding movement of the belt relative to bar 54. In use, the belts 56 and 61 (which latter is on tongue 44) may be secured to the frame of an automobile or the like.

Fig. 11 shows the rocking of the adjustment bar 54 against the arcuate surface 60 of the closed end of the cavity when in belt securing position. Fig. 12 shows the bar 54 in belt release position.

In Figs. 13, 14, 15, 16, 17 and 18 there are shown end and side views of various embodiments of adjustment bars useful in the safety belt buckle of the present invention. Referring to Figs. 13 and 14, there is shown an adjustment bar 53 having a pair of lateral slides 58 which are slidable and rockable in the channels 55 of Figs. 3 and 4. The channels should be of sufficient height to permit rocking of the adjustment bar to exert a maximum gripping or holding force on the belt. In one modification of the invention the channels are from .145 inch to .150 inch high and the adjustment bars have slides of thickness of from .080 inch to .090 inch. Generally these slides should be of sufficient strength to withstand the forces which might be applied to such a safety belt buckle. In Figs. 13 and 14 the slides are shown as diamond shaped. The cross sectional dimensions of the adjustment bar as seen in Figs. 13, 15 and 17 may vary, but dimensions of about 0.33 inch on the width and about 0.14 inch in height are satisfactory on bars approximately 2 5/16 inches long. In one particular embodiment, the arcuate portion of the gripping face 60 of end 24 had a radius of 0.187 inch in a buckle of about 2.75 inches long and 3 inches wide. Generally it is preferred that the adjustment bars have rounded edges to prevent cutting of the safety belt and permit free sliding action of the belt thereover.

In Figs. 15 and 16 is shown another form of adjustment bar 62 having a rectangular slide 64 which is offset from the central portion of the end of the bar.

In Figs. 17 and 18 is shown a still further modification of an adjustment bar 66 having slides 68. The slides 68 of this particular form are wedge shaped and have rounded surfaces to provide ease of rocking in operation.

Fig. 19 shows the tilting of the slides 58 in the lateral grooves 55 when the adjustment bar is in belt securing position.

It will be obvious that certain modifications of the specific embodiments shown may be made without departing from the spirit and scope of this invention. For example, the adjustment bar 54 and abutment surface 60 may be provided with a gripping surface such as is obtained by knurling. It is also apparent that the relative shape of the housing and the enclosed members may be altered to provide a relatively narrow long buckle, or it may be slightly curved to provide an inner surface which is readily conformable to the body of one who is wearing the safety belt. In manufacturing the belt buckle of the present invention materials should be chosen which are rigid, relatively light in weight, and highly resistant to shock and deformation. Materials such as aluminum, steel and magnesium are well suited for the manufacture of the main component parts of the safety belt herein described. The belting may be attached to the apertured tongue by means of stitching, as is shown in Figs. 1 and 2, or alternatively the belting may be secured to the tongue member by means of rivets or clamps. Generally it may be said that the safety belt buckle of the present invention is readily adapted for use as an automobile or aircraft safety belt, wherein the ends of the belt are secured to the frame of the vehicle terminating in the presently described buckle device.

While the safety belt buckle is particularly adapted for use in automobiles or aircraft, other similar uses are contemplated.

The safety belt buckle of the present invention is readily adaptable for use by others, such as structural steel workers, steeple jacks, and window washers.

It will thus be seen that a safety belt buckle has been provided which has a positive locking feature. It may also be seen that there has been provided a safety belt buckle which is readily releasable with a minimum of pressure, but in which the hazard of accidental release is substantially minimized.

Another accomplishment of the present safety belt buckle is the provision of a single belt buckle having separate adjustment and locking means, said adjustment being accomplished by the use of but one hand.

While several particular embodiments of this invention are shown above, it will be understood, of course, that the invention is not to be limited thereto since many modifications may be made and it is contemplated therefore by the appended claims to cover any such modifications as fall within the true spirit and scope of this invention.

We claim:

1. A buckle for use with a safety belt comprising a box-like housing of unitary construction having face, side and end members, said housing being open at one end to provide an insertion aperture and cavity extending from said open end, substantially through the body, said housing having a transverse aperture in one face of the housing communicating with said cavity; a stepped latch member secured in the cavity and pivotal between an open and locking position, said latch member being formed with a base step, an annular portion, an intermediate step with a latching protuberance thereon, and a lip member angularly disposed from the intermediate step, said base step being disposed parallel to and abutting against the one face of the housing and being provided with nibs on either side thereof extending to substantially the width of the cavity, the intermediate step being intermediately disposed between the faces of the housing cavity, the ends of said base step being adapted to engage said housing whereby said latch pivots about the ends of the base step; a spring member disposed between the latch member and the other face of the housing adapted to urge the latch member toward said one face of the housing; the other face of said housing being provided with a recess at the open end thereof extending a relatively short distance therefrom to admit the protruding angularly disposed lip of the latch member; a pair of locking pins extending into the cavity adjacent the sides of said housing and adapted to secure the latch member from withdrawal from said cavity; said side members having a pair of slots on the internal surface thereof extending the length of the cavity and from the bottom of the cavity of a thickness to admit the nibs on the sides of the lower step of the latch member, and an apertured tongue adapted for insertion within the cavity and slidable in the slots thereof, said tongue being engageable with the latching protuberance on said latch member.

2. A buckle for use with a safety belt comprising a flat box-like housing having face, side and end members, forming a longitudinal blind cavity in one end thereof, extending from the one end substantially the entire length of the housing, and having a transverse aperture in the one face of the housing and communicating with said cavity, said side members having a pair of lateral slots disposed in the inner surfaces thereof, said slots abutting the inner surface of said one face of the buckle housing, a stepped latch member with a catch thereon disposed in the cavity and pivotal between an open and locking position, a spring disposed between the latch and the other face of the housing urging the latch to locking position against the said one face, a pair of locking pins securing the latch member from withdrawal from the cavity, an apertured tongue adapted for insertion in the cavity under the latch, said latch being so disposed as to permit insertion of the apertured tongue in the lateral slots in said cavity, an adjustment bar disposed across and within the other end of the cavity slidably and rockably reciprocable therein, said bar being adapted to secure a belt passing thereover against the end member of said housing.

3. A buckle for use with a safety belt comprising a flat box-like housing of unitary construction, having face, side and end members, said housing having a longitudinal cavity at the one end extending substantially the length of the housing, and having a transverse aperture in the one face of the buckle housing communicating with said cavity, said side members having a pair of grooves disposed on the inner surface thereof adjacent to the one face of the buckle; a stepped latch member having a securing pivot step, a latching step and a lip to provide a means for releasing and rotating the latch, said latch slidably engaging the pair of grooves in the housing at the securing step and being disposed within the cavity pivotal between an open and locking position and protruding only at the release lip, a spring disposed between the latch member and the other face of the housing, urging said latch member toward locking position, means securing the latch member from withdrawal, a sliding bar disposed across the other end of the cavity and slidably and rockably reciprocable therein, said bar being adapted to receive such belt and to grasp and release said belt between said bar and the end of the housing, and a thin apertured tongue member adapted to insert slidably in the internal grooves of the cavity, causing the latch member to ride over and engage the same.

4. A stepped latch member adapted for use in a safety belt buckle which comprises a flat base step provided with a pair of nibs extending laterally at the end thereof, an elevated intermediate step section provided with a catch protruding in the direction of the base step, said catch having a holding surface and an inclined forward surface adapted to slide over an engaging tongue, an angularly disposed elevating lip adapted to extend beyond a buckle housing and permit elevation of the other end of said latch member, wherein said latching step is disposed substantially parallel to the lower step.

5. A buckle for use with a safety belt comprising a box-like housing of unitary construction having opposing faces, sides and an end member, and having a cavity extending from one end thereof substantially the length of the housing, and having a transverse aperture in one face of said housing communicating with said cavity; said side members having a pair of slots disposed in the inner surface thereof adjacent the one face of the housing from the one end of the cavity to a point mediate therein; a pair of channels formed in the side members within said cavity extending from the other end thereof adjacent said transverse aperture; a unitary stepped latch member secured in the cavity, said latch member being formed with a base step, a rising portion, an intermediate step with a latching protuberance thereon, and a lip member angularly disposed from the upper step, said base step being disposed parallel to and adjacent the one face of the housing and being provided with nibs on either side thereof extending to substantially the width of said lateral slots, the intermediate step being intermediately disposed between the faces of the housing cavity, said latch member being adapted to pivot about the end of the base step between open and locking positions; a spring member disposed between the latch member and the other face of the housing adapted to urge the latch member to locking position against the said one face; the angularly disposed lip of said latch member protruding through the other face of said housing adjacent the open end thereof; locking pin means extending into the cavity adjacent the sides thereof and interposed in a mediate portion thereof and adapted to secure the latch member inserted therein from withdrawal by abutment against the nibs on the base step thereof; and an adjustment bar having a body portion and a pair of laterally disposed slides at the ends thereof disposed within the cavity, said slides slidable in the channels adjacent the other end thereof, said adjustment bar being adapted to reciprocate rockably in said channels and thereby to secure such belt passing thereover against the end of the housing in a belt securing position; and an apertured tongue slidably insertable in the lateral slots of said cavity from the one end causing the latch member to engage the same in locking position.

6. The belt buckle of claim 5 wherein the closed end of the cavity is arcuately shaped to permit maximum contact with said belt and adjustment bar when the bar is rocked in belt securing position.

7. A readily assembled buckle for use with a safety belt comprising a unitary housing having two faces and connecting sides defining a cavity at the one end extending substantially the length of the housing, said sides having an internal lateral contour narrowing in successive steps, said housing having a transverse aperture in one face thereof adjacent the other end of said housing communicating with said cavity, an adjustment bar disposed across the other end of the cavity and slidably and rockably reciprocable therein, said bar being adapted to receive such safety belt passing thereover and through said transverse aperture securing said belt between said adjustment bar and the other end of the cavity, a stepped latch member comprising a base step, an intermediate step and a lip member angularly disposed from the intermediate step secured within the cavity and pivotal about intermediate positions along said stepped sides between an open and locking position, spring means adapted to urge said latch to said locking position, and an apertured tongue adapted for insertion into said cavity and engagement with the latch member.

References Cited in the file of this patent

UNITED STATES PATENTS

| | | |
|---|---|---|
| 256,087 | Wiesenmeyer | Apr. 4, 1882 |
| 2,710,999 | Davis | June 21, 1955 |

FOREIGN PATENTS

| | | |
|---|---|---|
| 738,989 | Great Britain | Oct. 26, 1955 |